United States Patent
McLean et al.

(10) Patent No.: US 11,645,434 B2
(45) Date of Patent: May 9, 2023

(54) SYSTEMS AND METHODS FOR AUTONOMOUS VEHICLE SYSTEMS TESTING

(71) Applicant: Rockwell Collins, Inc., Cedar Rapids, IA (US)

(72) Inventors: Angus L. McLean, Bradenton, FL (US); Jaclyn A. Hoke, Marion, IA (US); Scott S. Rediger, Marion, IA (US); Joshua R. Bertram, Ames, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 197 days.

(21) Appl. No.: 17/324,421

(22) Filed: May 19, 2021

(65) Prior Publication Data

US 2021/0271792 A1 Sep. 2, 2021

Related U.S. Application Data

(62) Division of application No. 15/443,903, filed on Feb. 27, 2017, now Pat. No. 11,042,673.

(51) Int. Cl.
*G06F 30/20* (2020.01)
*G06F 30/15* (2020.01)
*G06F 117/08* (2020.01)

(52) U.S. Cl.
CPC .............. *G06F 30/20* (2020.01); *G06F 30/15* (2020.01); *G06F 2117/08* (2020.01)

(58) Field of Classification Search
CPC ........ G06F 30/20; G06F 30/15; G06F 30/331; G06F 2117/08; G09B 9/02; G09B 9/05;
(Continued)

(56) References Cited

U.S. PATENT DOCUMENTS 5,260,874 A 11/1993 Berner et al.
7,735,058 B2 6/2010 Kinsella et al.
(Continued)

OTHER PUBLICATIONS

Hodson, D. & Hill, R. "The art and science of live, virtual, and constructive simulation for test and analysis" J. Defense Modeling & Simulation: Applications Methodology Technology, vol. 11, issue 2, pp. 77-89 (2014) (Year: 2014).*
(Continued)

*Primary Examiner* — Jay Hann
(74) *Attorney, Agent, or Firm* — Suiter Swantz pc llo

(57) ABSTRACT

A method for testing platforms (e.g., live, virtual, and/or constructive platforms associated with autonomous aircraft systems and their component subsystems) in a live/virtual/constructive (LVC) environment. In embodiments, the method includes determining, via a testbed engine, the development state of a platform component under test. The method includes retrieving a test to be executed, the test including test conditions to be applied to the component. The method includes determining whether the component is enabled to respond to the test conditions. The method includes, if the component is enabled to respond to the test conditions, executing the test while monitoring the component to detect a first output response and a second output response. The method includes identifying, via the testbed engine, at least one change in the development state of the component by comparing the first and second output responses.

16 Claims, 8 Drawing Sheets

(58) Field of Classification Search
CPC ............... F01D 21/003; F05D 2260/12; F05D 2260/81; F05D 2260/83
See application file for complete search history.

(56) References Cited

U.S. PATENT DOCUMENTS

| | | |
|---|---|---|
| 8,072,992 B2 | 12/2011 | Deal et al. |
| 8,676,560 B2 | 3/2014 | Kajitani et al. |
| 8,812,284 B2 | 8/2014 | Damiani et al. |
| 9,058,749 B2 | 6/2015 | Wenger et al. |
| 10,417,360 B2 | 9/2019 | Melmoth et al. |
| 2013/0166271 A1 | 6/2013 | Danielsson et al. |
| 2014/0288896 A1 | 9/2014 | Li |

OTHER PUBLICATIONS

Hoke J. et al., "Embedded LVC Training: A Distributed Training Architecture for Live Platforms", Interservice/Industry Training, Simulation, & Education Conf. (I/ITSEC) 2012, Paper No. 12385 (Year: 2012).

Horneber, J. & Hergenroder, "A Survey on Testbeds and Experimentation Environments for Wireless Sensor Networks", IEEE Communication Surveys & Tutorials, vol. 16, No. 4, (2014), (Year: 2014).

Kannan, S. et al., "Simulation and Development Environment for Multiple Heterogeneous UAVs", AIAA Molding & Simulation Technologies Conf., AIAA 2004-5041 (2004 (Year: 2004).

McLean, T. et al., "LVCA: An Integrated Architecture of Live, Virtual, Constructive and Automated Elements for UAS Experimentation and Training", AUVSI (2013) (Year: 2013).

\* cited by examiner

SYSTEMS AND METHODS FOR AUTONOMOUS VEHICLE SYSTEMS TESTING

CROSS-REFERENCE TO RELATED APPLICATIONS

The instant application claims the benefit of priority under 35 U.S.C. § 121 as a divisional application of U.S. patent application Ser. No. 15/443,903 filed Feb. 27, 2017. Said U.S. patent application Ser. No. 15/443,903 is herein incorporated by reference in its entirety.

BACKGROUND

The inventive concepts disclosed herein relate generally to the field of avionics systems. More particularly, embodiments of the inventive concepts disclosed herein relate to systems and methods for autonomous vehicle systems simulation and testing, such as using a live-virtual-constructive environment.

As autonomous aircraft systems become increasingly complex and require integration during many complex subsystems, it becomes increasingly difficult to effectively develop and test subsystems. In addition, existing paradigms for determining airworthiness of aircraft often depend on a pilot, aircrew, or other human-in-the-loop operator to be directly involved during testing procedures, such as to safely control the vehicle through the test envelope. Autonomous vehicles, however, are designed to obviate the need for human-in-the-loop control, and thus cannot depend on existing paradigms.

SUMMARY

In an aspect, embodiments of the inventive concepts disclosed herein are directed to a method for testing platforms (e.g., live platforms, virtual platforms, constructive platforms associated with autonomous aircraft systems and their component subsystems) in a live/virtual/constructive (LVC) environment. In embodiments, the method includes determining, via a testbed engine, the development state of a platform component under test. The method includes retrieving a test to be executed, the test including test conditions to be applied to the component. The method includes determining whether the component is enabled to respond to the test conditions. The method includes, if the component is enabled to respond to the test conditions, executing the test while monitoring the component to detect a first output response and a second output response. The method includes identifying, via the testbed engine, at least one change in the development state of the component by comparing the first and second output responses.

In some embodiments, the method includes determining the development state of the component based on a specification of the platform.

In some embodiments, the method includes retrieving a live test and one or more associated requirements of the live test, and generating test conditions based on the requirements.

In some embodiments, the method includes detecting a first output response based on a first test and a second output response based on a second test.

In some embodiments, the method includes determining an expected response to the test condition based on the development state of the component under test and executing the test such that the second output response corresponds to the expected response.

In some embodiments, the method includes receiving platform data from the platform under test via a simulation engine and generating, via the simulation engine, a simulated environment for the platforms and/or components under test based on the platform data. The method includes executing the simulated environment via the testbed engine while executing the test.

In some embodiments, the method includes determining a portion of code associated with the component under test that executes while the test is executed.

In some embodiments, the method includes, if the component is not enabled to respond to the test condition, emulating the output response while executing the test.

In some embodiments, the method includes predicting an expected response to the test condition, and emulating the output response based on the expected response.

In some embodiments, the method includes identifying a change regression of the development state of the component under test.

In some embodiments, the method includes outputting an indicator of the identified regression.

In some embodiments, the method includes retraining, via the testbed engine, the regressing component.

In some embodiments, the method includes resolving the identified regression by emulating the associated component.

In some embodiments, the method includes identifying an aberrant behavior of the component under test based on a difference between an expected (or first) output response and an actual (or second) output response.

In some embodiments, the method includes updating the development state of the component under test based on the second output response.

In some embodiments, the method includes monitoring physiological data associated with a pilot and, based on the physiological data, evaluating a current state of the pilot (e.g., based on workload, attention, and/or performance).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
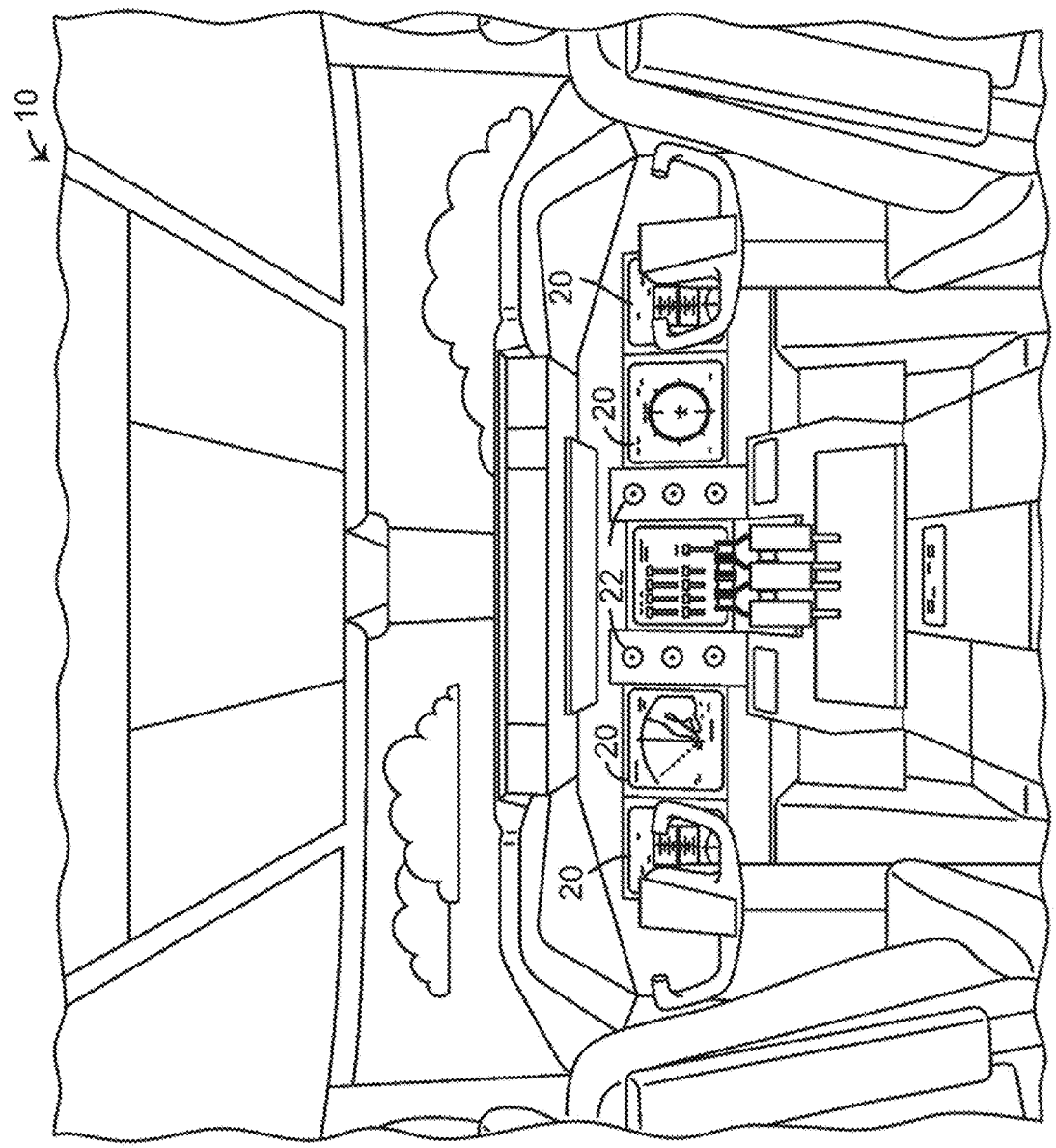
FIG. 1A is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b).

Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for autonomous vehicle systems simulation and testing, such as by implementing a live-virtual-constructive (LVC) environment. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a first communication interface, a second communication interface, and a simulation engine. The first communication interface is configured to communicate with a first platform. The second communication interface is configured to communicate with a second platform. The simulation engine is configured to receive first data from the first platform, receive second data from the second platform, generate a simulated environment based on a model of an environment about at least one of the first platform or the second platform, update the simulated environment based on the first data and the second data, transmit the updated simulated environment to the first platform via the first communication interface, and transmit the updated simulated environment to the second platform via the second communication interface.

The system can be integrated with an airborne platform or other platform as described herein. For example, the avionics system can be an avionics system of the airborne platform, and the display system can be an aircraft cockpit display of the airborne platform.

Systems manufactured in accordance with the inventive concepts disclosed herein can improve the manufacturing, testing, integration, and operation of platforms and components of platforms by using a simulation engine and/or a testbed engine in an LVC environment that allows for seamless transition from unit testing and integration testing of subsystems in a pure simulated environment, to testing of individual subsystems on a live platform (e.g., a live aircraft) with remaining subsystems in simulation, to incremental integration of all subsystems onto live aircraft. Systems manufactured in accordance with the inventive concepts disclosed herein can also improve manufacturing, testing, integration, and operation by allowing for changes to the platform through the development life cycle, including allowing for application testing to occur before hardware availability, as compared to existing development paradigms in which it may be highly costly to incorporate late-stage innovation. This may be advantageous during the development life cycle where early stage development is performed on desktop or server class hardware, but the hardware must later be optimized or otherwise tailored to specific size, weight, and power constraints of the vehicle or other platform where the hardware will be installed. In addition, by simulation and testing autonomous platforms with the level of detail and thoroughness allowed by the inventive concepts disclosed herein (which may not be possible in live testing), pilots or other operators of the autonomous platforms can be greater trust, familiarity with, and security in the autonomous platforms during actual use.

In addition, systems manufactured according to the inventive concepts disclosed herein can enable testing in which hazards can be identified and avoided which might otherwise not be detected (e.g., due to a remote pilot or other operator monitoring the test who is not in the loop and thus does not have situational awareness of possible hazards to be made aware of such hazards before all components have been fully developed). Such hazards may include danger of disorientation or incorrectly identifying an aircraft's orientation, even if a remote pilot has line of sight. Systems manufactured in accordance with the inventive concepts disclosed herein can allow for a demonstration or operational context to be developed that allows for hazards to be detected and identified even without sensory input that would be provided in human-in-the-loop operations, but not with autonomous platforms.

Referring to FIG. 1A, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 1B:
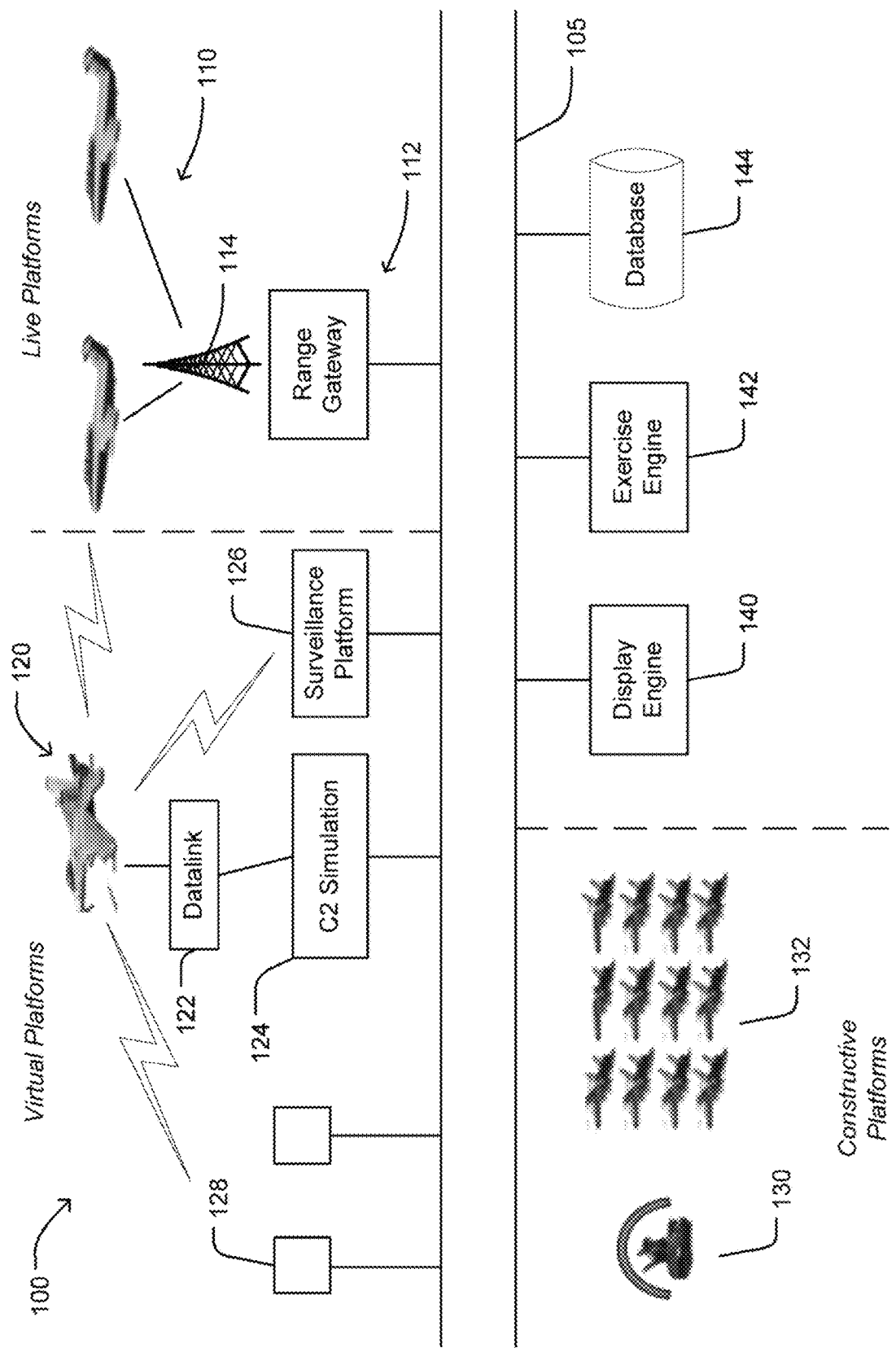
FIG. 1B is a schematic diagram of an exemplary embodiment of a LVC environment according to the inventive concepts disclosed herein.

Referring now to FIG. 1B, a schematic diagram of a system 100 including a LVC environment is shown according to an exemplary embodiment of the inventive concepts disclosed herein. The system 100 can include a network 105 configured to facilitate communication between live platforms 110, virtual platforms 120, 124, 126, 128, and constructive platforms 130, 132. The various platforms illustrated with reference to FIG. 1B are examples of platforms in each category (live, virtual, constructive), but the system 100 can be configured to facilitate communication between any other platforms.

The live platforms 110 can be piloted vehicles (e.g., piloted airborne platforms, piloted aircraft, trainer aircraft), remotely controlled vehicles (e.g., remotely controlled automobiles or drones, unmanned aircraft), or autonomous vehicles (e.g., unmanned autonomous vehicles). The live platforms 110 can be configured to communicate with the network 105 via a real or simulated or emulated range gateway 112, which may include or be operatively coupled to a communications device 114 (e.g., a radio tower). The range gateway 112 can be configured to transmit range data to the live platforms 110. The range gateway 112 can include a range network emulation engine configured to generate range data associated with virtual or constructive platforms based on data received from the virtual or constructive platforms. The range gateway 112 can include one or more range monitors configured to detect range data regarding the live platforms 110.

The virtual platforms can be simulated platforms, such as tactical cockpit simulators, simulated airborne platform 120, a command and control (C2) simulation 124, a surveillance platform or virtual avionics procedure trainer (VAPT) simulation 126, or other simulated platforms 128, such as ground vehicle simulations. As compared to the live platforms 110, a greater proportion (e.g., some or all) of the sensory data received by the virtual platforms may be simulated rather than received from physical or live sensors, and control instructions received from an autopilot or user control interface by the virtual platforms may be used to generate simulated responses rather than physical movement or other physical responses. The virtual platforms can include or be communicatively coupled to a virtual datalink 122, which may simulate or emulate electronic communications (e.g., wireless communications) between multiple virtual platforms, or may simulate a communication interface by which the virtual platforms communicate with the network 105 and the live or constructive platforms. The virtual platforms (e.g., airborne platform 120) may also include communications devices configured to directly receive signals from and transmit signal to the live platforms 110.

The constructive platforms can be computer-generated platforms, such as ground-based platforms 130 (e.g., surface-to-air threats) or airborne platforms 132 (e.g., air-to-air threats). For example, the simulation engine 216 can execute a platform model associated with characteristics of the constructive platforms such as movement ability and communications ability. As compared to the virtual platforms, the constructive platforms may be fully software-based throughout the development cycle of the systems being simulated or tested, and/or may not be configured to be controlled by a user or by an autopilot as complex as an autopilot of the virtual platforms.

The system 100 also includes a display engine 140, an exercise engine 142, and a database 144. The display engine 140 can be configured to receive data regarding the various platforms of the system 100 from the network 105 and generate a display of a simulation or test being executed by the system 100 (e.g., display using the various display solutions described with reference to FIG. 1A). The exercise engine 142 can be configured to generate and execute an exercise, simulation, and/or test to be performing using the various platforms of the system 100, including exercises having multiple missions and allowing for data updates between multiple platforms simultaneously. The exercise engine 142 can be configured to manage, update, or modify the exercise being executed based on real-time data received from the various platforms. The database 144 can store exercise data, simulation data, and/or test data, and can store data generated and received during the executed exercise, such as for generating models of platform or component behavior.

Figure 2A:
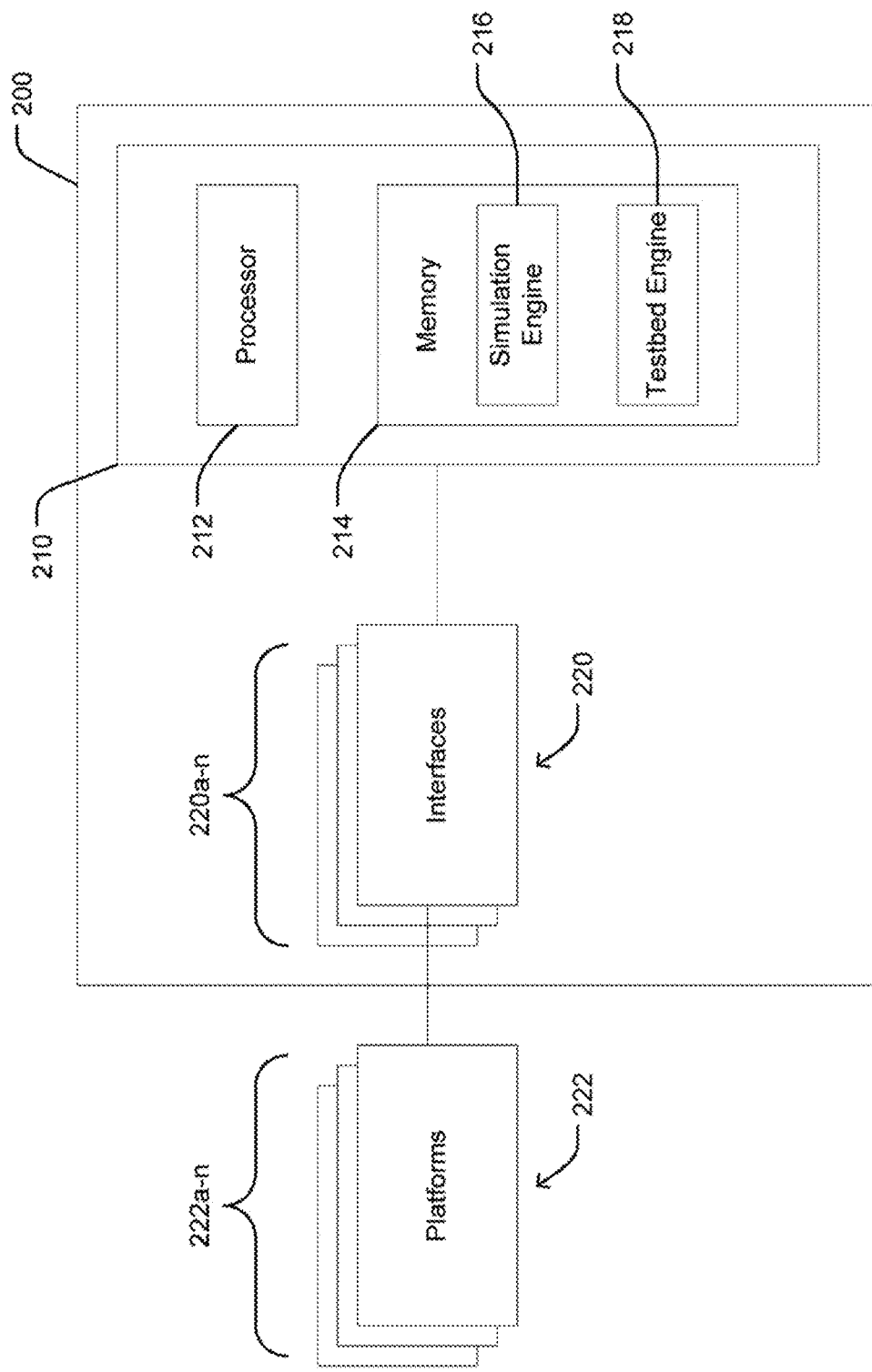
FIG. 2A is a block diagram of an exemplary embodiment of a system including a simulation engine and a testbed engine and implementing a LVC environment according to the inventive concepts disclosed herein.

Referring now to FIG. 2A, a schematic diagram of a system 200 is shown according to an exemplary embodiment of the inventive concepts disclosed herein. The system 200 includes a processing circuit 210 and one or more interfaces 220a-n (e.g., communication interfaces).

The interfaces 220a-n are configured to communicate data or other information between the processing circuit 210 and one or more platforms 222a-n (e.g., platforms similar to the various platforms described with reference to FIG. 1B). The interfaces 220a-n can be configured to facilitate communication by wired or wireless connections (e.g., via a network such as network 105 described with reference to FIG. 1B). The interfaces 220a-n can be configured to facilitate communication with a particular type of platform 222. For example, the first interface 220a can be configured to transmit data (e.g., simulation data, sensor data, environment data) to the specific or particular first platform 222a, such as by implementing or executing a communication protocol associated with the first platform 222a.

The interfaces 220a-n can allow for communication with the platforms 222a-n independent of a development state associated with the platforms 222a-n. For example, as software associated with components or systems of the platforms 222a-n evolves or develops from early prototypes (e.g., python scripts, MATLAB scripts) to functional code (e.g., C/C++, Java, ADA) to integrated code running on live hardware, the interfaces 220a-n may continue to be used to communicate with the platforms 222a-n. As such, fully integrated code can be executed in the environment as functional code or prototypes, allowing various systems and platforms 222a-n to communicate and be integrated in the LVC environment (e.g., can communicate with various live, virtual, or constructive platforms) regardless of the associated development states of the platforms 222a-n. The interfaces 220a-n can be configured to emulate data expected to be received by the platforms 222a-n. For example, the interfaces 220a-n can retrieve a specification indicating characteristics of data to be received by the platforms 222a-n (e.g., wavelengths of light or audio, communication protocols), identify differences between the data received from the simulation engine 216 or testbed engine 218 and the specification, and modify the data from the simulation engine 216 or testbed engine 218 to conform to the specification.

The processing circuit 210 (e.g., control circuit, processing electronics) can include a processor 212 and memory 214. The processor 212 may be implemented as a specific purpose processor, an application specific integrated circuit (ASIC), one or more field programmable gate arrays (FPGAs), a group of processing components, or other suitable electronic processing components. The memory 214 is one or more devices (e.g., RAM, ROM, flash memory, hard disk storage) for storing data and computer code for completing and facilitating the various user or client processes, layers, and modules described in the present disclosure. The memory 214 may be or include volatile memory or non-volatile memory and may include database components, object code components, script components, or any other type of information structure for supporting the various activities and information structures of the inventive concepts disclosed herein. The memory 214 is communicably connected to the processor 212 and includes computer code or instruction modules for executing one or more processes described herein. The memory 214 includes various circuits, software engines, and/or modules that cause the processor 212 to execute the systems and methods described herein.

In some embodiments, the memory 214 includes a simulation engine 216. In some embodiments, the memory 214 includes a testbed engine 218. While FIG. 2A illustrates the simulation engine 216 and testbed engine 218 as being included in a single memory device, in various embodiments, the simulation engine 216 and testbed engine 218 (or components thereof) may be distributed across a computer network. The simulation engine 216 can also execute the testbed engine 218 (or vice versa) as desired for a particular simulation, test, or other operation.

Figure 2B:
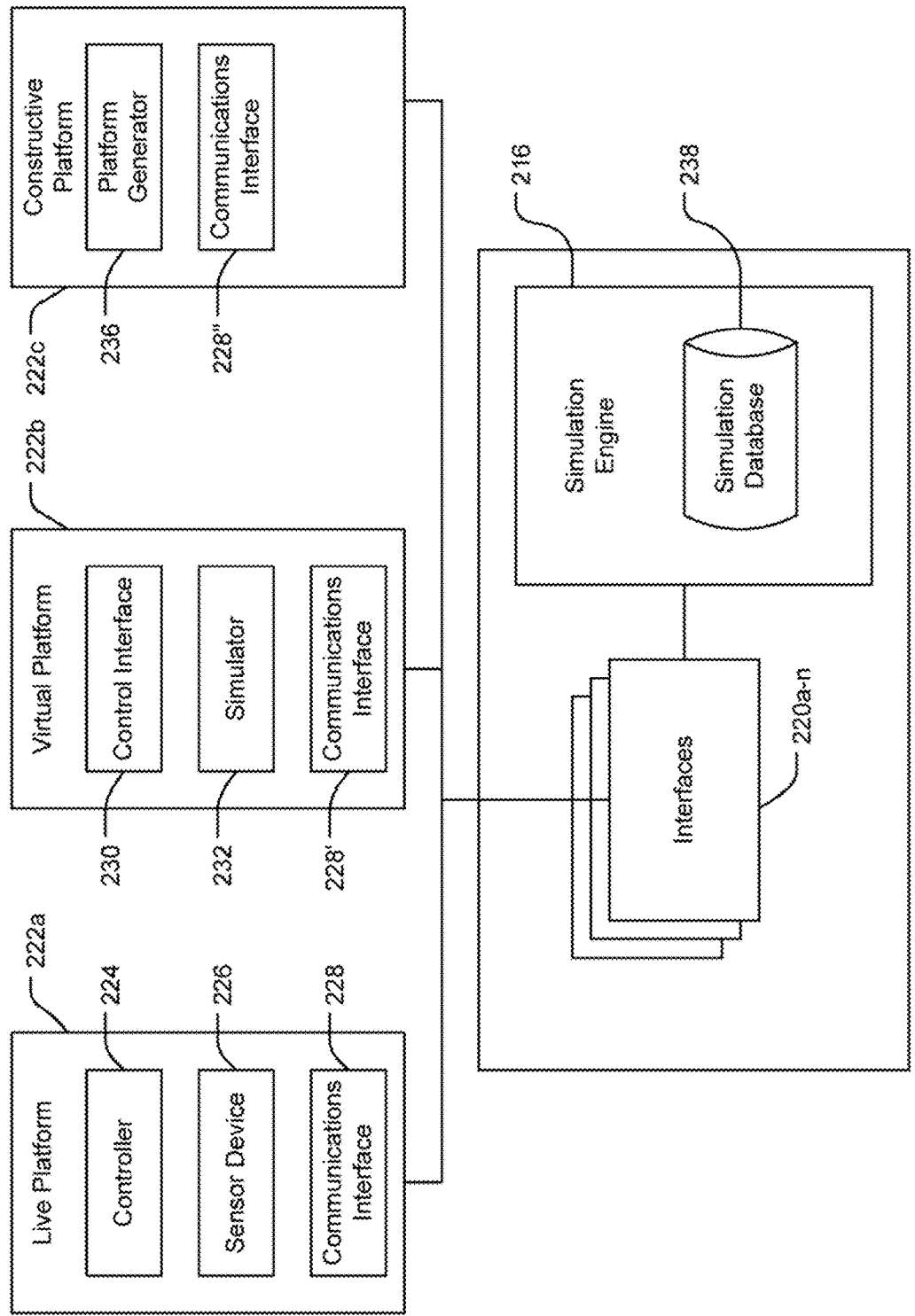
FIG. 2B is a block diagram illustrating implementation of an exemplary embodiment of the simulation engine of FIG. 2A according to the inventive concepts disclosed herein.

Referring now to FIG. 2B, an exemplary embodiment of implementations of the simulation engine 216 is shown according to the inventive concepts disclosed herein. The simulation engine 216 is configured to communicate with any number of platforms 222a-n via interfaces 220a-n. As will be described herein, the simulation engine 216 can be configured to communicate with the platforms 222a-n in an agnostic manner, such that each platform 222a-n interfaces with the simulation engine 216 (and each other) as each platform 222a-n expects (e.g., receives sensory data and transmits platform data according to a standard or typical manner or protocol). Similarly, each platform 222a-n may perceive the other platforms 222a-n in a similar manner regardless of the development state of the platforms 222a-n or whether the platforms 222a-n are live, constructive, or virtual platforms. This can allow for improved simulation and testing, such as to allow various components and platforms to each develop at their own pace, especially where the maturity of solutions evolves over time and mature solutions may not be available until late in the development process. While FIG. 2B illustrates one each of the live, virtual, and constructive platforms 222a-c, it will be appreciated that the inventive concepts described herein can be applied to implementations associated with various combinations of two or more platforms (which may be live, virtual, or constructive).

As shown in FIG. 2B, the simulation engine 216 can be configured to communicate with a live platform 222a, a virtual platform 222b, and a constructive platform 222c. The simulation engine 216 can merge constructive, simulated, and live data from the corresponding platforms 222a-c, including executing multiple or disparate missions as part of simulation or testing protocols, and providing data updates across live, virtual, and constructive platforms simultaneously. As such, the simulation engine 216 can allow for more realistic simulation, testing, and operation of the platforms 222a-c than existing systems.

The live platform 222a (e.g., an autonomous vehicle), includes a controller 224, a sensor device 226, and a communications interface 228. The live platform 222a can be similar to the live platforms described with reference to FIG. 1B, and can include features of the control center 10 described with reference to FIG. 1A. The controller 224 is configured to control operation of the live platform 222a according to control or command instructions. For example, the controller 224 can be a control system configured to control position, velocity, acceleration, and/or heading of the live platform 222a. The controller 224 can be configured to control motors, engines, turbines, rotors, braking systems, or other components of the live platform 222a configured to generate or adjust thrust or acceleration. The controller 224 can be configured to control wheels, ailerons, rudders, or other components of the live platform 222a configured to control heading or orientation of the live platform 222a. The controller 224 can receive the control instructions via the communications interface 228, particularly for remotely controlled vehicles. The controller 224 can also generate the control instructions, such as by executing an autopilot, particularly for autonomous vehicles. The controller 224 can receive control instructions The sensor device 226 is configured to detect sensor data for the live platform 222a. For example, the sensor device 226 can include at least one of an image capture device (e.g., a camera, a video camera), a radar sensor (including but not limited to a millimeter wave radar), a lidar sensor, or an audio sensor.

The sensor device 226 can receive sensor data from the simulation engine 216 via a first interface 220a and the communications interface 228. For example, the simulation engine 216 can transmit the sensor data according to a protocol expected by the sensor device 226 (e.g., transmit as electromagnetic radiation of wavelengths or wavelength bands as expected depending on the functionality or type of the sensor device 226). The simulation engine 216 can transmit the sensor data via interface 220a to the live platform 222a.

In some embodiments, such as where the live platform 222a is in a developing state and the exercise, simulation, or test being performed is in a controlled environment (e.g., the live platform 222a is an airborne platform being tested in a hangar), the communications interface 228 or the interface 220a can include a sensory data output device configured to generate sensory information analogous to what the sensor device 226 would detect in live operation. For example, an image projection device may be positioned adjacent to the sensor device 226 to generate an image associated with the simulated environment analogous to how the sensor device 226 would detect a real-world environment around the live platform 222a. Alternatively, the communications interface 228 could be configured to bypass the sensor device 226 to provide sensor data to the controller 224. For example, based on a type of exercise, simulation, or test being performed, the simulation engine 216 can output the sensor data via the interface 222a with an instruction configured to cause the communications interface 228 to transmit the sensor data to the controller 224, rather than to the sensor device 226.

The virtual platform 222b includes a control interface 230, a simulator 232, and a communications interface 228'. The virtual platform 222b can be similar to the virtual platforms described with reference to FIG. 1B. The virtual platform 222b can include or be coupled to features of the control center 10 described with reference to FIG. 1A. The control interface 230 is configured to receive control commands from an autopilot (e.g., an autopilot algorithm configured to generate control instructions based on at least one of the simulated environment around the virtual platform or a situational awareness of the virtual platform 222b) or a user, and transmit the control commands to the simulator 232. The simulator 232 is configured to execute a model regarding behavior of the virtual platform 222b (e.g., a model regarding movement or communication of the virtual platform 222b). For example, the virtual platform 222b can be a ground-based vehicle, the simulator 232 can receive environment data indicating terrain along which the virtual platform 222b is traveling from the simulation engine 216, and the simulator 232 can determine how the virtual platform 222b will move along the terrain based on the environment data and the model regarding behavior of the virtual platform 222b.

The communications interface 228' can be similar or identical to the communications interface of the live platform 222a, except that the communications interface 228' may be configured to execute communications protocols specific to a virtual platform (e.g., a platform in which any sensor data is received from the simulation engine 216 or the simulator 232, rather than a live sensor device 226).

The constructive platform 222c includes a platform generator 236 and a communications interface 228". The communications interface 228" may be similar or identical to the communications interfaces 228, 228', except that the communications interface 228" may be configured to receive and transmit all data (e.g., sensor data, control data) used by the platform generator 236. The platform generator 236 is configured to generate the constructive platform 222c, such as by executing a model indicating behavior of the platform 222c.

In some embodiments, the simulation engine 216 is configured to generated a simulated environment. The simulated environment can be a representation of an environment (e.g., represented as environment data or environment information) about a platform (e.g., within sensory range of a platform). The simulated environment can include background information (e.g., geography information, terrain information, weather information). The simulated environment can include information regarding platforms and other objects in the environment. The simulated environment can include dynamic information (e.g., movement of objects). The simulated environment can be a three-dimensional representation of the environment, such as a three-dimensional representation associating detected or expected sensory data with points in space in the environment. The simulated environment can include a battlefield environment. The simulated environment can be generated as a point cloud or other three-dimensional data structure associating features or characteristics of the environment with spatial positions. The features or characteristics may include electromagnetic information or a representation thereof, such as a wavelength and intensity of light. The simulated environment can be a set of data representing a real or simulated world within sensory range of a platform.

The simulated environment can be a set of data for describing at least one of a real-world environment, a simulated environment, or a synthetic environment, such as for describing environments to the platforms 222. The synthetic environment may include data synthesized based on both real-world data and simulated data. For example, the simulation engine 216 can receive real world data from a sensor device configured to sample or detect the real world data (e.g., a camera, a radar device). The simulation engine 216 can receive or generate virtual or simulated data, which may be generated based on executing a simulation, such as a simulation of the virtual platform 222b, or based on data received from the constructive platform 222c.

In some embodiments, the synthetic environment is generally fully or totally in simulation. For example, even if the synthetic environment is generated based on real world data received from a physical sensor device, the synthetic environment can be generated in a format matching or corresponding to the simulated data generated by the simulation engine 216. This can allow for a consistent manner for communicating or substituting data between a first set of data representing the real world and a second set of data representing the synthetic environment. For example, the simulated environment or synthetic environment can allow for a relationship to be perpetuated or retained between sampled real world data and simulated data.

The system 200 can include a simulation database 238. The simulation database can be similar to the exercise database 144 described with reference to FIG. 1B. In some embodiments, the simulation engine 216 is configured to generate the simulated environment based on a model of an environment about a platform. The model of the environment can be stored in the simulation database 238. The simulation database 238 can include predetermined models representing environment data or environment information, along with dynamic algorithms indicating how the environment changes over time. The simulation database 238 can record or otherwise store outputs and results from executed simulations, such as for the simulation engine 216 to generate models of platform behavior. The simulation database 238 can store exercise data (e.g., as described with reference to the exercise engine 142 of FIG. 1B). The simulation database 238 can store strategic or tactical protocols or commands, such that the simulation engine 216 can execute mission simulations by controlling operation of virtual or constructive platforms (or to communicate mission protocols to live platforms).

The simulation engine 216 can be configured to update the simulated environment based on data received from one or more platforms 222a-c (e.g., live platform 222a, virtual platform 222b, and/or constructive platform 222c). For example, the simulation engine 216 can receive pose data from the platforms 222a-c. The pose data can include at least one of a position or a heading (e.g., orientation) of the corresponding platform. In some embodiments, the pose data can also include or be associated with dynamic data or a dynamic state of the corresponding platform 222. For example, the dynamic data or dynamic state can indicate an acceleration/deceleration or expected acceleration/deceleration of the corresponding platform 222 (including whether the platform 222 is turning).

In some embodiments, the simulation engine 216 is configured to update the simulated environment based on the data received from one or more of the platforms 222a-c. For example, the simulation engine 216 can receive pose data from the one or more platforms 222a-c and update the simulated environment based on the pose data. The simulation engine 216 can also receive status data from the one or more platforms 222a-c, such as status data indicating an operational state of the one or more platforms 222a-c in the context of an exercise, simulation, or test being executed (e.g., the constructive platform 222c may be disabled or destroyed) and update the simulation based on the status data.

The model of the environment can include an expected feature of the environment. The expected feature can be a terrain or other geographic feature, such as mountains or bodies of water. The expected feature can also be a man-made structure, such as buildings, runways, aircraft carriers, or other platforms.

In some embodiments, the simulation engine 216 is further configured to receive data (e.g., environment data) from the sensor device 226, or from a remote sensor (not shown). For example, the live platform 222a can be configured to transmit environment data detected by the sensor device 226 to the simulation engine 216 via communications interface 228.

The simulation engine 216 can determine whether the expected feature of the environment is present in the environment data received from the platform(s) 222a-c or the remote sensor, and generate the simulated environment further based on the received environment data. For example, the simulation engine 216 can simulate a representation of the expected feature if the expected feature is not present in the environment data. This may be advantageous where the sensor device from which the environment data is received is not functioning properly (e.g., is in a developing state as will be described further herein), but the platforms 222a-c require an accurate representation of the environment that would otherwise be generated based on environment data detected by the non-functioning sensor device.

In some embodiments, the simulation engine 216 is configured to modify how the virtual platform 222b is represented in the simulated environment. For example, the simulation database 238 can store a model of the virtual platform 222b. The model of the virtual platform 222b can include expected features of the virtual platform 222b. The simulation engine 216 can retrieve a model associated with the virtual platform 222b from the simulation database 238 based on an identifier associated with the virtual platform 222b.

The simulation engine 216 can modify the representation of the virtual platform 222b based on the retrieved model. The simulation engine 216 can compare the virtual data from the platform 222b to the model of the platform 222b, determine a difference between the virtual data and the model based on the comparison, and generate or selectively modify the simulated environment to represent the difference. For example, if the virtual data indicates that the virtual platform 222b is travelling at a speed that is not within expected parameters for the virtual platform 222b (e.g., speed determined based on a difference in pose data), the simulation engine 216 can modify the speed or pose of the virtual platform 222b in the simulated environment.

In some embodiments, the interfaces 220a-n are configured to emulate expected sensor data received by the platforms 222a-c. The interface 220a can retrieve a model or other indication of expected sensor data for the live platform 222a, determine one or more characteristics of the expected sensor data, and modify a representation of the simulated environment to match the one or more characteristics of the expected sensor data.

In some embodiments, the simulation engine 216 can advantageously generate the simulated environment to simulate or emulate an environment in which the platforms 222a-c may appear to be in locations that are different than a physical location of the platforms 222a-c (or of the electronic hardware that is running or executing the platforms 222a-c). For example, the simulation engine 216 can be used to execute testing or training simulations in which one or more platforms 222a-n receive sensor data indicating that the platforms 222a-n are flying in formation, even if the platforms 222a-n are located far apart and/or are on the ground in hangars or other stationary locations. In some embodiments, generating a simulated environment and/or executing a test as described herein can allow for more realistic testing to be executed while satisfying regulatory requirements regarding flight test envelopes and other safety factors. For example, for development of some platforms 222, regulatory restrictions may not allow for live tests to be executed that fully evaluate the functionality of the platform 222. In some embodiments, generating a simulated environment and/or executing a test as described herein can allow for a remote pilot (e.g., a pilot remotely controlling the platform 222) to build intuition of how the platform 222 reacts under different situations, helping to improve an ability of the pilot to detect and recover from aberrant or undesired behavior during a test (e.g., a flight test) or simulation. For example, unlike existing systems which may allow for human-in-the-loop testing, testing with autonomous platforms and/or remotely controlled platforms may require increased workload from a pilot, which can be effectively monitored and can allow for effective human-autonomy teaming using the simulation engine 216 and/or testbed engine 218 according to embodiments of the inventive concepts disclosed herein.

For example, each of the platforms 222a-n can be associated with a real pose. The simulation engine 216 can be configured to associate a simulated pose with each platform 222. The simulated pose can be similar or identical to the real pose (e.g., if the particular platform 222 is to be treated as if were located in the same location in the simulated environment as its real-world location). The simulated pose can different from the real pose (e.g., if the particular platform 222 is to be treated as if it were located in a different location in the simulated environment than its real-world location).

By using a different simulated pose from the real pose for the particular platform 222, the simulation engine 216 can generate the simulated environment so that the particular platform 222 perceives the simulated environment (e.g., receives sensor data indicative of the simulated environment) in a manner that differs from how the platform 222 would perceive the simulated environment as would be expected based on the real-world location of the platform 222, and similarly other platforms can perceive the particular platform 222 within the simulated environment in a manner different than how the particular platform 222 would be perceived based on its real-world location).

For example, for the live platform 222a, the simulation engine 216 and/or interface 220a can output the simulated environment to the live platform 222a so that the sensor device 226 receives sensor data indicative of the simulated pose. As an illustration of such an example, the sensor data received by the sensor device 226 may indicate that the live platform 222a is flying in a formation, even if the live platform 222a is located on the ground or is stationary.

As another example, for the virtual platform 222b, the simulation engine 216 and/or interface 220b can output the simulated environment to the virtual platform 222b so that the simulator 232 receives sensor data indicative of the simulated pose via the communications interface 228. For the virtual platform 222b, the communications interface 228 may be the only or primary device by which the simulator 232 receives sensor data (e.g., as compared to the live platform 222a, which may be a vehicle traveling in a first location by which a sensor device or a user could receive information regarding an environment around the vehicle separately from the simulation engine 216).

As another example, for the constructive platform, the simulation engine 216 and/or interface 220c can output the simulated environment to the constructive platform 222c so that the platform generator 236 receives sensor data indicative of the simulated pose via the communications interface 228. The simulated environment can be outputted according to a protocol (e.g., functions of an application programming interface) by which the constructive platform 222c expects to receive sensor data.

In some embodiments, the simulation engine 216 determines the simulated pose based on at least one of the model of the environment, an identifier of the platform 222, or a simulation, testing, or training exercise being performed. For example, the model of the environment can indicate features relative to which the platform 222 is expected to be posed, such as terrain or bodies of water. The identifier of the platform 222 can indicate a type of the platform 222, such as whether it is an airborne platform, a ground-based platform, a water-based platform, or any other type of platform as described herein. The simulation engine 216 can determine an altitude or depth of the platform 222 based on the model and the identifier. In addition, the exercise being performed can indicate a location for the platform 222 (including a relative location as compared to one or more other platforms 222, such as leader or follower platforms, ally platforms, or enemy platforms), and the simulation engine 216 can thus determine the simulated pose based on the indicated location.

In some embodiments, the simulation engine 216 determines the simulated pose based on a mission being executed with an exercise, simulation, or test. For example, the simulation engine 216 can determine which platforms 222 to group together, such as in formations.

Figure 2C:
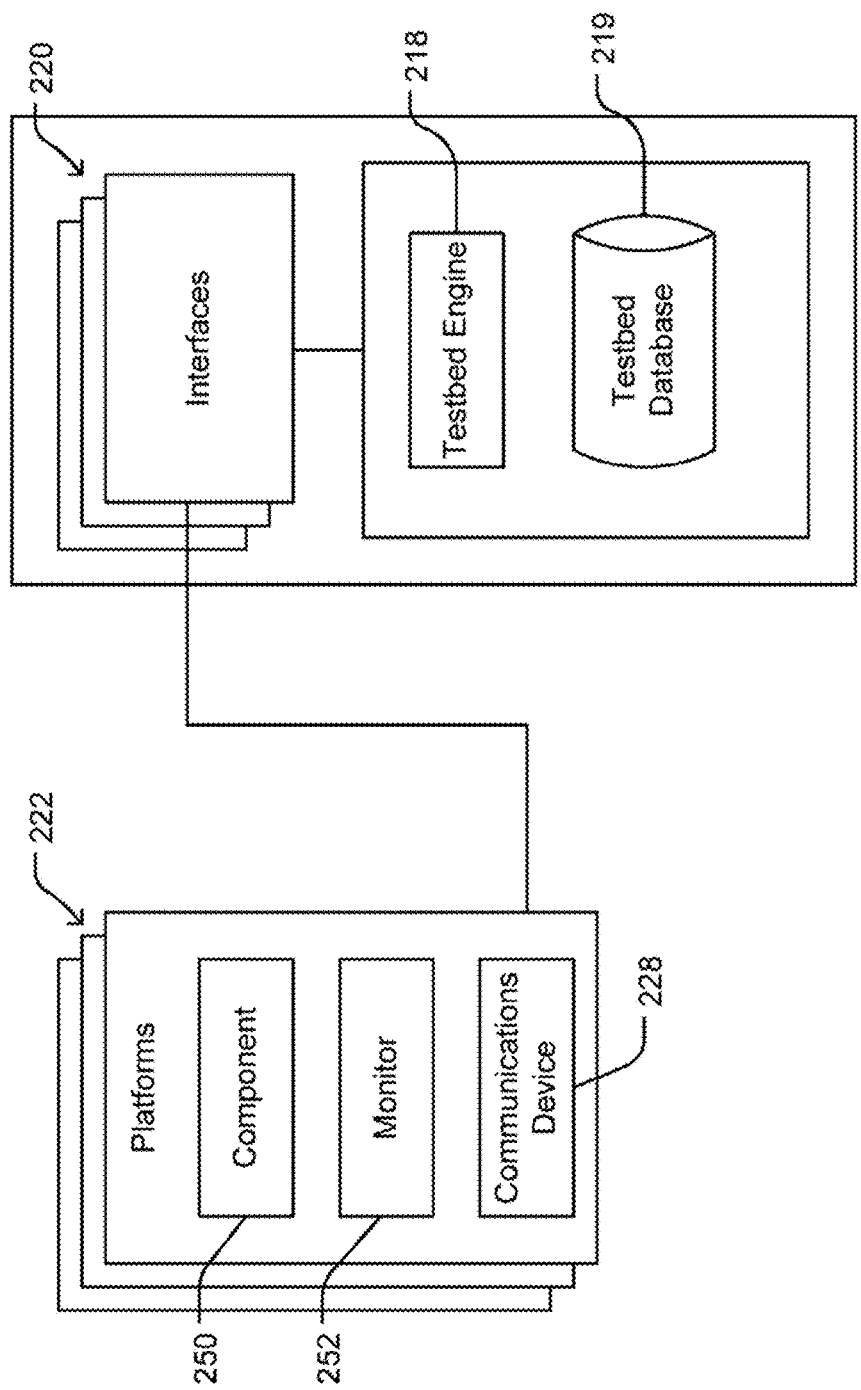
FIG. 2C is a block diagram illustrating implementation of an exemplary embodiment of the testbed engine of FIG. 2A according to the inventive concepts disclosed herein.

Referring now to FIG. 2C, an exemplary embodiment of implementations of the testbed engine 218 is shown according to the inventive concepts as disclosed herein. As shown in FIG. 2C, the testbed engine 218 can be configured to communicate with one or more platforms 222*a-n* via interfaces 220*a-n*. The testbed engine 218 can retrieve exercise, simulation, and/or test protocols from a testbed database 219. Advantageously, some embodiments of the testbed engine 218 can allow testing procedures and other operations to be executed amongst the one or more platforms 222*a-n* regardless of a current state of development of each of the platforms 222*a-n*. For example, the testbed engine 218 can be configured to determine development states for components of the platforms 222*a-n*, and while executing a test, emulate an output of various components depending on whether the components are able to function or generate results or other output data in response to various test conditions. The testbed engine 218 can allow for development of components and platforms 222*a-n* in various advantageous manners as described herein, including allowing for different components to be developed at different paces or schedules, for edge or corner cases to be evaluated that otherwise could not be tested before live flight, or for integrating components earlier during the development cycle. Unlike existing systems, in which components may be stubbed out or otherwise replaced with simple versions with outputs that may not be realistic, systems manufactured according to the inventive concepts disclosed herein can execute tests using the testbed engine 218 while using realistic versions of the platforms 222*a-n* (e.g., live, virtual, or constructive platforms) or the components thereof to allow for more realistic integration of components during testing.

In some embodiments, each platform 222 includes one or more components 250. The component 250 can be a component to be tested. The component 250 can be any mechanical, electronic, hardware, firmware, or software component of the platform 222, including but not limited to control systems, mechanical systems, communication systems, navigation systems, autopilot systems, or environmental systems. The component 250 can be configured to generate or cause a response based on a test condition or other external stimulus.

Each platform 222 can also include one or more monitors 252. The monitor 252 is configured to monitor the component 250 to sense or detect the response of the component 250. For example, where the response is an electrical or mechanical action (e.g., an output of current or voltage; a movement of the component), the monitor 252 can be configured to detect the electrical or mechanical action. The monitor 252 can also include software instrumentation to detect data output from software associated with the component 250.

In some embodiments, the monitor 252 is or includes one or more sensor devices. The sensor device can be an image capture device (e.g., a camera). The sensor device can be one or more devices configured to detect physiological data of a pilot (e.g., a human subject). For example, the sensor device can be coupled to or worn under a flight suit to detect physiological data of the pilot, such as heart rate, blood pressure, body or skin temperature, skin conductance, or other physiological parameters of the pilot. The testbed engine 218 can be configured to record, monitor, and/or classify a pilot state based on the detected physiological data. For example, the testbed engine 218 can classify pilot state based on at least one of a workload metric, an attention metric, or a performance metric. The testbed engine 218 can generate a model of normal or desired pilot state based on the detected physiological data and/or historical physiological data or known parameters. The testbed engine 218 can monitor the physiological data detected by the monitor 252 (e.g., during execution of a test) to determine whether the pilot state is an undesirable state, such as cognitive overload or focus-lock, based on comparing the detected physiological data to a normal or desired pilot state. In some embodiments, evaluating the pilot state as described herein can allow for measuring teaming effectiveness and safety during tests involving a human subject.

Each platform 222*a-n* can also include the communications device 228 for communication with the testbed engine 218. The communications device 228 can transmit data to the component 250, and can receive data from the monitor 252. In some embodiments, the communications device 228 receives data directly from the component 250.

The component 250 is associated with a development state. The development state may be organized into binary categories, such as being at least one of a developing state or a complete state. The development state may be organized according to a discrete or continuous order of categories, such as from an undeveloped state to a developing state to a complete state. The development state can indicate current functionality of the component 250. For example, the development state can indicate a subset of functions of the component 250 which the component 250 is configured or enable to execute or perform at a point in time.

The development state can be a surrogate state, such as where a manned surrogate platform 220 is used for hardware-in-the-loop testing of the manned surrogate prior to fully autonomous flights. The manned surrogate platform 220 can include a recording assembly configured to record or detect data regarding operation of the manned surrogate platform 220. The recording assembly can be configured for a rear seat equipment or avionics rack or tray assembly, such as to be mounted as a line replaceable unit to the rack. The recording assembly can include a sensor device, a power inverter, and a chiller (e.g., to maintain appropriate temperature), and may be mounted to seat rails.

The testbed engine 218 can be configured to retrieve a specification for the platforms 222*a-n* (e.g., from testbed database 219). The specification can include a list of functions of each component 250, and can indicate expected functionality for the platforms 222*a-n*, including expected functionality for the component(s) 250 of each platform 222. The specification can indicate a development state for various components 250.

The specification may correspond to the development state of the component 250. The specification can indicate a plurality of functions of the component 250, and the development state can indicate a corresponding state of development for each of the plurality of functions. As an illustrative example, if the component is a navigation system having a first function for determining an altitude of an aircraft and a second function for determining coordinates of the aircraft (e.g., a GPS receiver), the development state can indicate the state of development for the first function and for the second function (e.g., the state of development for the electronic components associated with the corresponding functions). The specification can include the development state for the component 250. The specification 250 can be stored by the testbed engine 218 (e.g., with the testbed database 219) or by the platform 222. The testbed engine 218 can determine the development state of the component 250 based on the specification.

The testbed engine 218 can retrieve a test (e.g., from the testbed database 219). The test can include one or more test conditions to be applied to the platform 222 (or the component(s) 250 of the platform 222). The test conditions can include command instructions (e.g., software instructions) for exercises or simulations. The test conditions can include physical conditions, such as temperature, pressure, or pose. This test conditions can include voltages or other electric signals to be applied to the platform 222.

The test can be configured for simulated platforms 220, such as during an early stage of the development process. The test can be configured fora mix of simulated and live platforms 220, such as for live testing of the live platforms 220 while other platforms or components are still being developed (or to control parts of the test not associated with the live platforms 220).

In some embodiments, the testbed engine 218 can be configured to execute a test that includes disabling one or more components 250, such as to test the response of other components 250 to adverse conditions. For example, the testbed engine 218 can cause radio links to be severed, servos and sensors to fail and be modeled, or otherwise cause subsystem failures. The components can be disabled during execution of the test, while output responses from other components 250 are monitored by the monitor 252.

The testbed engine 218 can determine whether the component 250 is enabled to respond to the test condition. For example, based on the development state of the component 250, the testbed engine 218 can determine whether the component 250 is expected to respond to the test condition. The development state may indicate whether a function of the component 250 which uses the test condition as an input is enabled.

The testbed engine 218 can execute the test. For example, the testbed engine 218 can transmit the test condition of the test to the component 250 to cause the component 250 to respond to the test condition. In some embodiments, the testbed engine 218 is configured to execute the test to include a simulated environment generated by executing the simulation engine 216. In some embodiments, the testbed engine 218 is configured to execute the test based on the component 250 being enabled to respond to the test condition.

The testbed engine 218 can execute the test while monitoring the component 250 to detect an output response. For example, the testbed engine 218 can transmit the test condition to the component 250 via the interface 220, and receive a signal from the monitor 252. The testbed engine 218 can wait for the signal from the monitor 252 (e.g., output an indication that the test is complete when the signal from the monitor 252 is received; retransmit the test condition until the signal from the monitor 252 is received). The testbed engine 218 can parse the signal from the monitor 252 to determine whether the test is complete, or to identify the output generated by the component 250 responsive to the test condition. The output may be evaluated to determine whether it falls within expected parameters.

In some embodiments, the testbed engine 218, if the component 250 is not enabled to respond to the test condition, the testbed engine 218 can emulate the output response. For example, the testbed engine 218 can predict an expected response of the component 250 to the test condition. The expected response may be predicted based on a model of the component 250, such as a model generated using past responses of the component 250, or responses of components similar to the component 250. The testbed engine 218 can execute the test while the output response is being emulated.

In some embodiments, the testbed engine 218 is configured to determine component regression. The testbed engine 218 can execute a first test, and record a first output response detected while monitoring the component 250. The testbed engine 218 can execute a second test. The second test can be executed after or subsequent to the first test, such as after or subsequent to a change in the component 250. The change in the component can include a change in the development state of the component 250, or a replacement of the component 252. The testbed engine 218 can detect a second output response while monitoring the component 250 during the second test.

The testbed engine 218 can compare the first output response to the second output response, such as to determine or identify a change regression of the component 250. For example, the testbed engine 218 can determine that the development state of the component 250 has changed, such as if a function of the component 250 which was enabled during the first test (e.g., the monitor 252 detected an output from the component 250 associated with a function of the component 250 in the first response) is not enabled during the second test (e.g., the monitor did not detect an output from the component 250 associated with the component 250 in the second response). In some embodiments, the first test and second test are selected based on the development state of the component 250 indicating that the component 250 is enabled to respond to or generate a response to test condition (s) of the second test, so that any changes in the output response can be determined from comparing the first output response to the second output response. The testbed engine 218 can update the development state of the component 260 based on the second response. In some embodiments, the component 250 is configured to output an error code (e.g., an error code indicating that the component 250 is not enabled to cause or execute a response to the test condition), and the testbed engine 218 can determine that regression has occurred based on the error code.

In some embodiments, the testbed engine 218 can take action responsive to or based on determining the regression or other change between the first response and the second response. For example, the testbed engine 218 can be configured to output an indication of the regression, such as by indicating the development state(s) of the component 250 associated with the first response and/or the second response. If the component 250 is determine to have regressed, the testbed engine 218 can modify the component 250, such as by retraining the component 250. This can be beneficial where innovation is added during a later stage of the development process, such that the component 250 can be retrained upon identifying regression (e.g., retraining a machine learning algorithm executed in association with developing the component 250).

The testbed engine 218 can be configured to emulate the component 250 (or the output response thereof), such as to resolve the regression (e.g., allow other components 250 and/or platforms 222a-n to continue to run the second test).

For example, the testbed engine 218 can execute a model of expected responses of the component 250 to the test conditions. In some embodiments, the testbed engine 218 is configured to use actual responses of the component 250 (or other components, which may be similar to the component 250, under other test conditions, which may be similar to the test conditions of the second test) to generate and/or update the model of expected responses. For example, the testbed engine 218 can emulate the output response of the component 250 based on at least one of a model of the component 250 or a previous test of the component 250. This may allow the output response (as emulated) to be a function of the test condition and be independent of the development state of the component 250.

In some embodiments, the testbed engine 218 is configured to identify or determine unexpected or aberrant behavior of the component 250. Unexpected behavior or aberrant behavior may be associated with a difference between an expected response and an actual response of the component 250 that is greater than a threshold difference, or when a test results in output of an error code or a malfunction of the component 250. The threshold difference may be a set value, or may be determined based on historical data (e.g., the testbed engine 218 can retrieve a plurality of prior responses to test conditions or similar test conditions from a database, and generate a model of expected behavior, such as by selecting a confidence level and marking prior responses which are outliers based on the confidence level as unexpected or aberrant). The testbed engine 218 can record a plurality of output responses of the component 250 corresponding to a plurality of test conditions, generate a predictive model of component response to the test conditions based on the recorded output conditions, and determine an expected aberrant behavior (e.g., an expected response or range of expected responses) based on the predictive model.

To determine aberrant behavior, the testbed engine 218 can execute a test (e.g., a flight test) when the component 250 is in the complete state, and while executing the test, monitor an input condition or test condition applied to the component 250. The testbed engine 218 can determine the expected aberrant behavior based on the predictive model of component response and the input condition or test condition. The testbed engine 218 can output an indication of the expected aberrant behavior to a pilot interface (e.g., an interface of aircraft control center 10 described with reference to FIG. 1A). It will be appreciated that the testbed engine 218 can also similarly output an indication of expected behavior (e.g., normal, typical, non-aberrant).

In some embodiments, the testbed engine 218 is configured to execute a requirements-based test. For example, the testbed engine 218 can use the monitor 252 to detect the output response. The testbed engine 218 can generate the test condition based on a requirement associated with a live test (e.g., a test that might typically be performed while the platform is in the field, airborne, at sea, or otherwise subject to live conditions that may be less controlled than a typical simulation or lab-scale test). The testbed engine 218 may retrieve the live test and its associated requirements from the testbed database 219. The requirement may be associated with a performance threshold or other required response of the component 250. The requirements-based test may correspond to one or more functions of the component 250. For example, the requirements-based test may indicate an output or plurality of outputs for a function of the component 250 that satisfies a corresponding requirement. The testbed engine 218 can whether the component 250 adheres to or otherwise properly functions with a corresponding interface of the component 250.

In some embodiments, at least one of the testbed engine 218 or the monitor 252 is instrumented with a code coverage tool. For example, while executing a test, the testbed engine 218 (or monitor 252) can be configured to determine a portion of code (e.g., software) associated with the component 250 which is executed while executing the test. The code coverage tool can be executed while performing or executing a requirements-based test.

Figure 3:
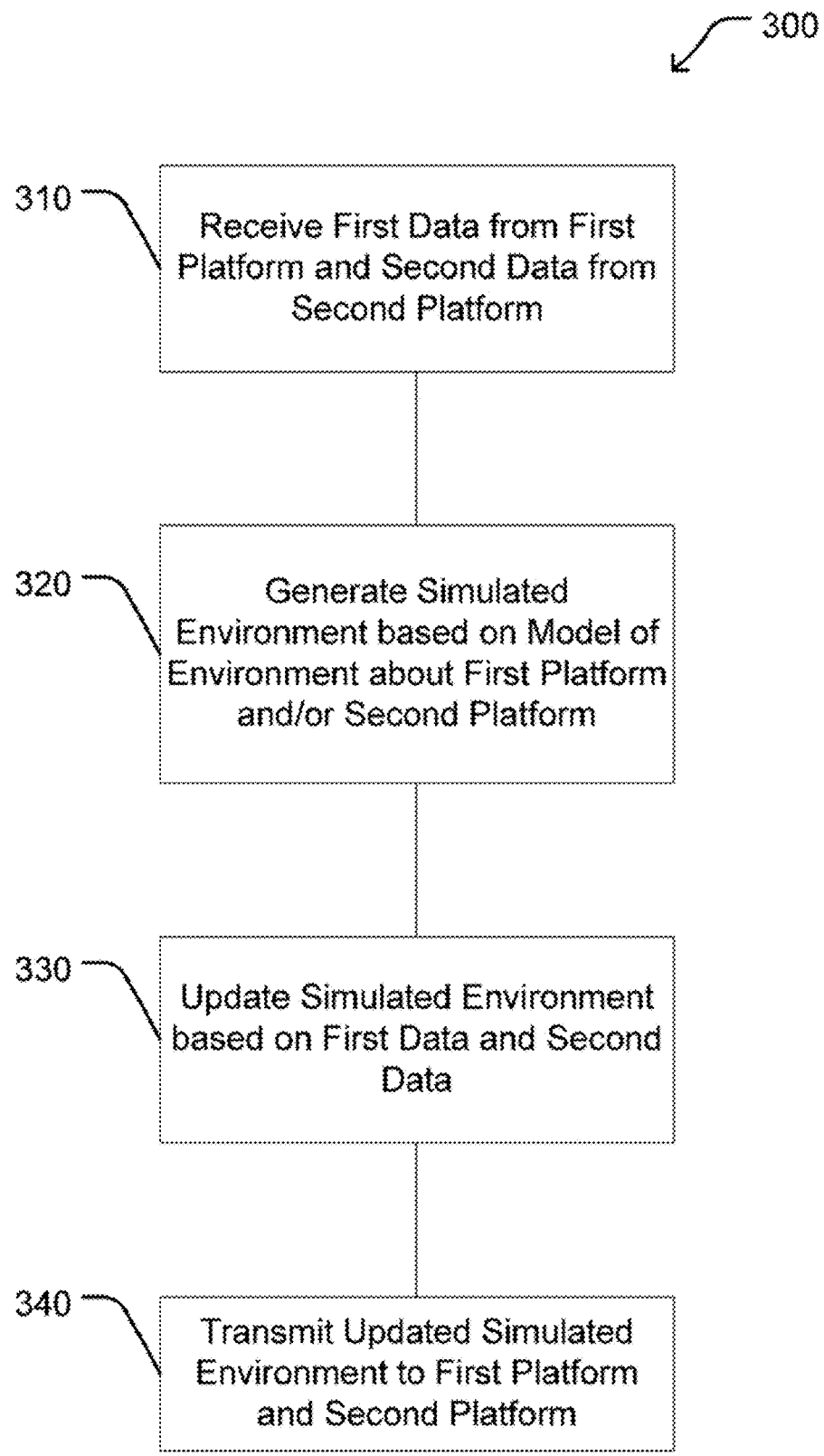
FIG. 3 is a diagram of an exemplary embodiment of a method according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft control center 10, the system 100, the system 200, and/or components thereof.

A step (310) may include receiving first data from a first platform and second data from a second platform. The first data and/or the second data may indicate a pose of the associated platform, such as a pose indicating position and/or heading information. Each platform may be a live platform, a virtual platform, or a constructive platform.

A step (320) may include generating a simulated environment based on a model of an environment around or about at least one of the first platform or the second platform. The model of the environment can include an expected feature of the environment. Based on environment data received from a sensor, such as a sensor of a platform or a sensor located remote from the platforms, it can be determined whether the expected feature is present in the environment data.

If the expected feature is not present in the environment data, then the expected feature can be simulated or emulated when generating the simulated environment.

In some embodiments, where the first platform is a virtual platform, the virtual data can be compared to a model of the virtual platform. Based on this comparison, a difference can be determined between the virtual data and the model, and the simulated environment can be generated to represent the difference.

A step (330) may include updating the simulated environment based on the first data and second data. For example, positions, headings, and other information regarding the platforms can be used to represent the platforms in the simulated environment, such as movement of the platforms within the simulated environment. In addition, the first data or second data may include sensor data detected regarding the real-world environment around the corresponding platform, and the sensor data can be used to update environment.

A step (340) may include transmitting the updated simulated environment to the first platform and the second platform. For example, the updated simulated environment may be transmitted as image data, audio data, or other sensor data. In some embodiments, expected sensor data to be received by a sensor of the first platform or second platform, such as by modifying image data to correspond to wavelengths of light expected by the sensor.

In some embodiments, the method further includes receiving third data from a third platform, and updating the simulated environment further based on the third data. The updated simulated environment may be transmitted to the third platform.

Figure 4:
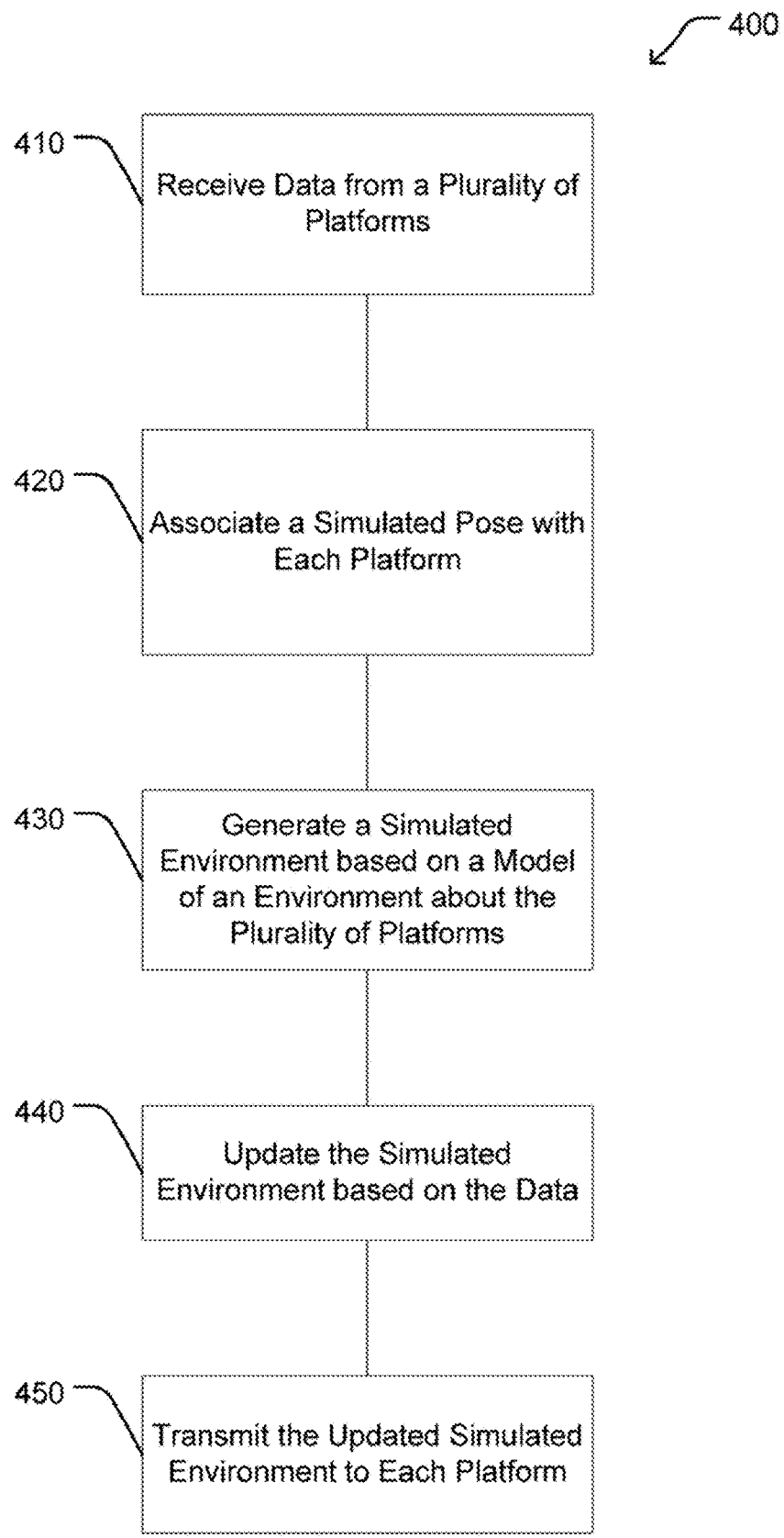
FIG. 4 is a diagram of an exemplary embodiment of another method according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the aircraft control center 10, the system 100, the system 200, and/or components thereof.

A step (410) may include receiving data from a plurality of platforms. A step (420) may include associating a simulated pose with each platform. The simulated pose may be determined based on an exercise, simulation, or test being executed. The simulated pose may be determined based on a type or identify of the associated platform. The simulated pose may include at least one of a position or orientation of the associated platform.

In some embodiments, at least one simulated pose is different than a real pose of the associated platform. This may allow for an exercise, test, or simulation to be executed where platforms perceive each other to be in different locations than real world locations, allowing for operations that may not otherwise be possible if the platforms were required to interact based only on their real world locations.

A step (430) may include generating a simulated environment based on a model of an environment about the plurality of platforms. A step (440) may include updating the simulated environment based on the data. A step (450) may include transmitting the updated simulated environment to each platform.

Figure 5:
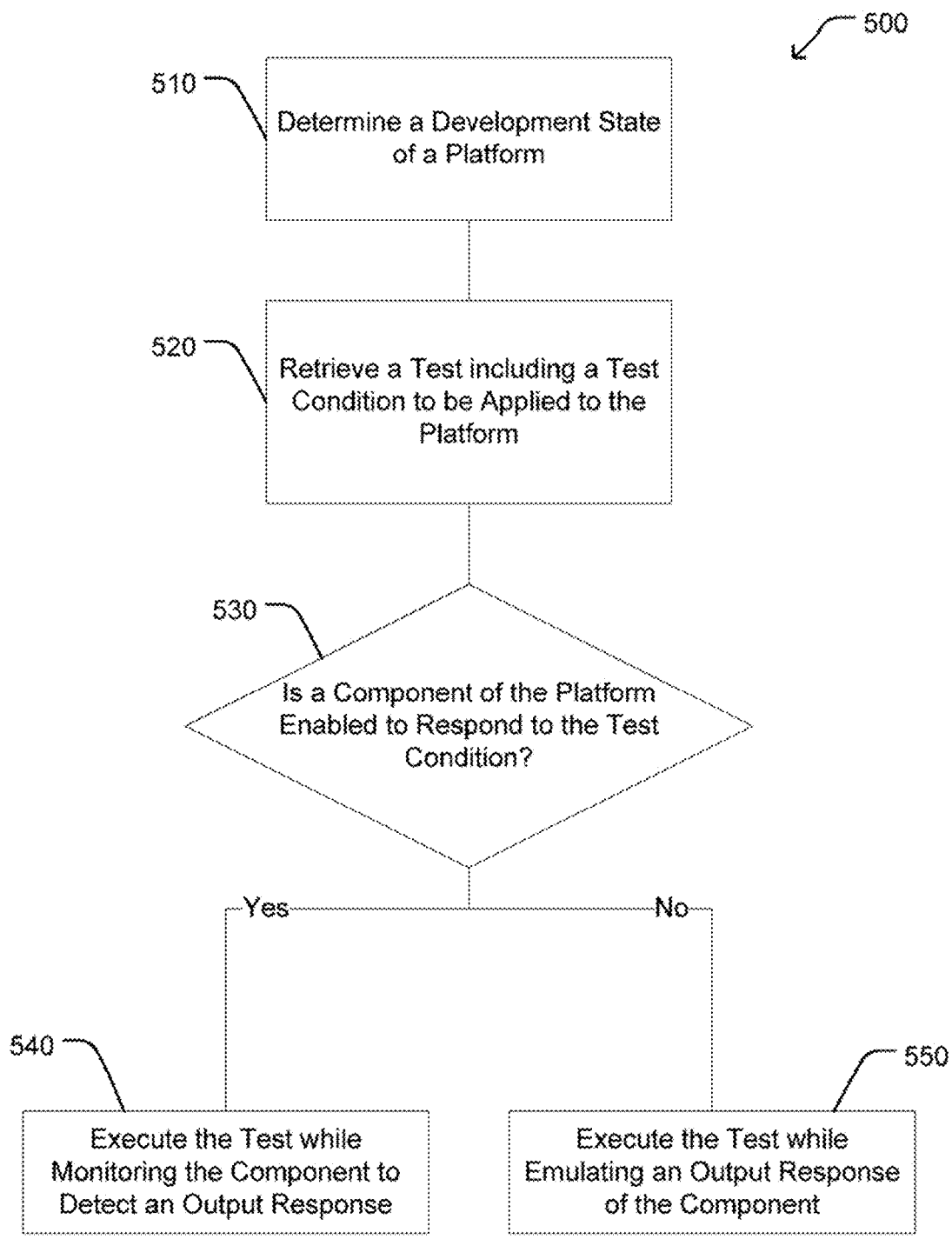
FIG. 5 is a diagram of an exemplary embodiment of another method according to the inventive concepts disclosed herein.

Referring now to FIG. 5, an exemplary embodiment of a method 500 according to the inventive concepts disclosed herein may include the following steps. The method 500 may be performed using various hardware, apparatuses, and systems disclosed herein, such as the aircraft control center 10, the system 100, the system 200, and/or components thereof.

A step (510) may include determining a development state of a platform or a component thereof. The development state may be a developing state or a complete state. The development state may also be a surrogate state (e.g., for testing with a manned surrogate platform). The development state may indicate whether the platform or component is capable of performing particular functions. The development state may be determined based on retrieving a specification regarding the platform.

A step (520) may include retrieving a test. The test can include a test condition to be applied to the platform or a component thereof. The test condition may be a software-based command, instruction, or representation of sensor data to be transmitted. The test condition may be a physical condition, such as temperature or pressure, or an indication of location. The test condition may be an electrical signal (e.g., a voltage).

A step (530) may include determining whether the component is enabled to respond to the test condition. The component may be enabled to respond to the test condition based on its development state. The component may be enabled to respond to the test condition based on whether a function associated with the test condition (e.g., a function that uses the test condition as an input) is active, enabled, or otherwise accessible to the test condition.

If the component is enabled to respond to the test condition, then a step (540) can include executing the test while monitoring the component to detect an output response. For example, a hardware sensor device or software monitor (e.g., instrumented software) can be used to determine whether the component generates an output responsive to the test condition. In some embodiments, the test condition can include or be generated based on a requirement associated with a live test, and the output response compared to the requirement to determine if the component satisfies the requirement.

If the component is not enabled to respond to the test condition, then a step (550) can include executing the test while emulating an output response of the component. For example, a model of the component representing responses to various test conditions can be used to emulate the response. The model may be determined or generated based on past responses of the component or of similar components. This can allow the output response to be a function of the test condition and be independent of the development state of the component.

In some embodiments, the method includes determining a regression or other change of the component. A first output response can be detected and recorded while monitoring the component during a first test. A second test can be executed (e.g., subsequent to a known change in the development state of the component). A second output response can be detected while monitoring the component during the second test. A regression or other change, such as a change in development state, can be determined based on comparing the first output response to the second output response and determining a difference between the first output response and the second output response. In some embodiments, an indication of the regression can be generated and outputted. In some embodiments, the output response of the component can be emulated to resolve the regression based on or in response to determining the regression.

In some embodiments, the method includes determining unexpected or aberrant behavior of the component. For example, a plurality of output responses can be recorded corresponding to a plurality of test conditions. A predictive model of component response to test conditions can be generated based on the recorded output responses. A test (e.g., a flight test) can be executed when the component is in the complete state. While executing the test, an input condition to the component can be monitored, and an expected aberrant behavior can be determined based on the input condition and the predictive model, so that an indication of the expected aberrant behavior can be outputted to a pilot interface.

As will be appreciated from the above, systems and methods for an avionics graphics interface according to embodiments of the inventive concepts disclosed herein may improve manufacturing, operation, simulation, and testing of platforms and avionics systems by providing for testing and simulation in a LVC environment. For example, such systems and methods can allow for various components to be developed at disparate paces, yet to still communicate and be integrated throughout the development process, allowing for late-stage innovation to efficiently be implemented throughout the platforms.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A method for testing platforms in a live/virtual/constructive (LVC) environment, the method comprising:
   determining, via a testbed engine, at least one development state associated with a component of a platform in an LVC environment;
   retrieving, via the testbed engine, at least one test comprising one or more test conditions to be applied to the at least one component;
   determining, via the testbed engine, whether the at least one component is enabled to respond to the test condition;
   if the at least one component is enabled to respond to the test condition, executing, via the testbed engine, the at least one test while monitoring the at least one component to detect a first output response and a second output response;
   and
   identifying, via the testbed engine, at least one change in the development state by comparing the first output response and the second output response.

2. The method of claim 1, wherein determining, via a testbed engine, at least one development state associated with a component of a platform in an LVC environment includes:
   determining the at least one development state based on at least one specification associated with the platform.

3. The method of claim 1, wherein retrieving, via the testbed engine, at least one test comprising one or more test conditions to be applied to the at least one component includes:
   retrieving a live test and one or more requirements associated with the live test;
   and
   generating the one or more test conditions based on the one or more requirements.

4. The method of claim 1, wherein executing, via the testbed engine, the at least one test while monitoring the at least one component to detect at least one of a first output response and a second output response includes:
   detecting the first output response based on executing a first test;
   and
   detecting the second output response based on executing a second test.

5. The method of claim 1, wherein executing, via the testbed engine, the at least one test while monitoring the at least one component includes:
   determining at least one expected response to the test condition based on the development state of the at least one component;
   and
   executing the test such that the second output response corresponds to the expected response.

6. The method of claim 1, wherein executing, via the testbed engine, the at least one test while monitoring the at least one component includes:
   receiving, via a simulation engine, platform data from the at least one platform;
   generating, via the simulation engine, a simulated environment corresponding to the at least one platform and based on the platform data;
   and
   executing, via the testbed engine, the simulated environment while executing the at least one test.

7. The method of claim 1, wherein executing, via the testbed engine, the at least one test while monitoring the at least one component includes:
   determining, via the testbed engine, at least one portion of code associated with the at least one component, the at least one portion of code configured to execute while executing the at least one test.

8. The method of claim 1, further comprising:
   if the at least one component is not enabled to respond to the test condition, emulating, via the testbed engine, at least one output response while executing the at least one test.

9. The method of claim 8, wherein emulating, via the testbed engine, at least one output response while executing the at least one test includes:
   predicting, via the testbed engine, at least one expected response to the at least one test condition;
   and
   emulating the output response based on the at least one expected response.

10. The method of claim 1, wherein identifying, via the testbed engine, at least one change in the development state by comparing the first output response and the second output response includes:
    identifying a regression of the development state.

11. The method of claim 10, further comprising:
    outputting, via the testbed engine, an indicator of the regression.

12. The method of claim 10, further comprising:
    retraining, via the testbed engine, the at least one component associated with the regression.

13. The method of claim 10, further comprising:
    resolving, via the testbed engine, the regression by emulating the at least one component associated with the regression.

14. The method of claim 1, wherein identifying, via the testbed engine, at least one change in the development state by comparing the first output response and the second output response includes:
    identifying an aberrant behavior of the at least one component based on a difference between an expected output response and an actual output response.

15. The method of claim 1, further comprising:
    updating, via the testbed engine, the development state based on the second output response.

16. The method of claim 1, further comprising:
    monitoring physiological data associated with a pilot;
    and
    evaluating a pilot state of the pilot based on the physiological data.

* * * * *